United States Patent
Hirao et al.

(10) Patent No.: US 6,806,848 B2
(45) Date of Patent: Oct. 19, 2004

(54) DISPLAY APPARATUS FOR VEHICLE

(75) Inventors: Akinari Hirao, Yokohama (JP); Satoshi Kitazaki, Yokohama (JP); Kenji Ono, Yokohama (JP); Shunsuke Hijikata, Yokohama (JP); Kazuhito Kato, Yokohama (JP); Yoshiharu Nakaji, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 358 days.

(21) Appl. No.: 09/987,252

(22) Filed: Nov. 14, 2001

(65) Prior Publication Data

US 2002/0067366 A1 Jun. 6, 2002

(30) Foreign Application Priority Data

Dec. 1, 2000 (JP) ........................................ 2000-367237

(51) Int. Cl.⁷ ................................................ G06G 5/00
(52) U.S. Cl. .................... 345/3.4; 345/788; 345/798; 340/461; 250/206.1
(58) Field of Search .................. 345/3.4, 7, 8, 788, 345/789, 798; 340/461, 462, 426, 436, 815.4, 903, 937; 250/214 AL, 214 C, 370.1, 206.1, 206.2

(56) References Cited

U.S. PATENT DOCUMENTS

| | | | |
|---|---|---|---|
| 4,962,998 A | * 10/1990 | Iino | 359/630 |
| 5,034,732 A | * 7/1991 | Iino | 345/7 |
| 5,461,361 A | * 10/1995 | Moore | 340/461 |
| 5,796,350 A | 8/1998 | Fuse | |
| 6,614,344 B1 | * 9/2003 | Frasher et al. | 340/425.5 |
| 2001/0038360 A1 | * 11/2001 | Fukushima et al. | 345/8 |
| 2001/0043163 A1 | * 11/2001 | Waldern et al. | 345/7 |
| 2001/0045919 A1 | * 11/2001 | Ishikawa et al. | 345/8 |

FOREIGN PATENT DOCUMENTS

| | | |
|---|---|---|
| JP | 2616652 | 3/1997 |
| JP | 11-202285 | 7/1999 |
| JP | 2000-221475 | 8/2000 |
| JP | 2001-125067 | 5/2001 |

OTHER PUBLICATIONS

U.S. patent application Ser. No. 09/912,310, Oda et al., filed Jul. 26, 2001.

* cited by examiner

*Primary Examiner*—Henry N. Tran
(74) *Attorney, Agent, or Firm*—McDermott Will & Emery LLP

(57) ABSTRACT

A display unit is disposed in front of a driver's seat in a front central region of a passenger compartment of a vehicle. A sensor senses a condition, such as a driver's eye position, an outside brightness and a steering frequency, affecting the uneasiness of a driver caused by the display screen. A controller reduces the size of a picture display region in accordance with the condition to achieve an agreeable size and position of picture on the screen.

19 Claims, 11 Drawing Sheets

STEERING DIRECTION

DISPLAY APPARATUS FOR VEHICLE

BACKGROUND OF THE INVENTION

The present invention relates to a display disposed at a front part of a passenger compartment of a vehicle to provide various information.

In recent years, motor vehicles are equipped with displays for navigation aids and driver information system, for in-car television system, or for control of air conditioning system, audio system or other accessories in the form of a touch panel. Such an in-car display unit needs to have a larger screen to present a larger amount of information, and a large display unit is normally disposed at an instrument panel in a center region between a driver's seat and a front passenger's seat.

U.S. Pat. No. 5,796,350 (corresponding to Published Japanese Patent Application Publication (Kokai) No. 9(1997)-244003) discloses an automobile screen control apparatus arranged to adjust the brightness of a backlight in dependence on on/off conditions of lighting and left flasher to prevent driver annoyance with a bright display.

SUMMARY OF THE INVENTION

It is an object of the present invention to provide display control technique for altering a picture display region on a display screen adequately to reduce inconvenience of a display screen to a driver.

According to the present invention, a display apparatus for a vehicle, comprises: a display unit comprising a screen presenting information to a driver, the display unit being disposed in a front central region of a passenger compartment; a sensor section comprising an eye position sensor to sense an eye position of the driver; and a controller to reduce a size of a display region on the screen of the display unit and to shift a position of the display region in the screen upwardly toward a driver's seat's side as the eye position moves forward.

According to another aspect of the present invention, a display apparatus for a vehicle, comprise: a display unit comprising a screen presenting information to a driver of a vehicle, the display unit being located in a front region of a passenger compartment of the vehicle; an outside brightness sensor to sense a brightness outside the vehicle; and a controller to alter a display region in the screen of the display unit in accordance with the brightness sensed by the outside brightness sensor.

According to still another aspect of the present invention, a display apparatus comprises: a display unit comprising a screen presenting information to a driver of a vehicle, the display unit being disposed in a front region of a passenger compartment of the vehicle; a sensor section comprising a steering frequency sensor to sense a driver's steering frequency; and a controller to reduce a size of a display region on the screen of the display unit when the steering frequency increases.

According to still another aspect of the present invention, a display apparatus for a vehicle, comprises: means for presenting visual representation in a display region on a screen located in a front region of a passenger compartment of the vehicle; means for sensing an eye position of a driver relative to the screen; and means for altering the size of the display region on the screen in accordance with the eye position of the driver.

According to still another aspect of the present invention, a display control process for a vehicle, comprises: a process element of sensing an eye position of a driver relative to a screen of a display unit in a passenger compartment of the vehicle; and a process element of altering the size of a display region on the screen in accordance with the eye position.

The other objects and features of this invention will become understood from the following description with reference to the accompanying drawings.

DETAILED DESCRIPTION OF THE INVENTION

Figure 1:
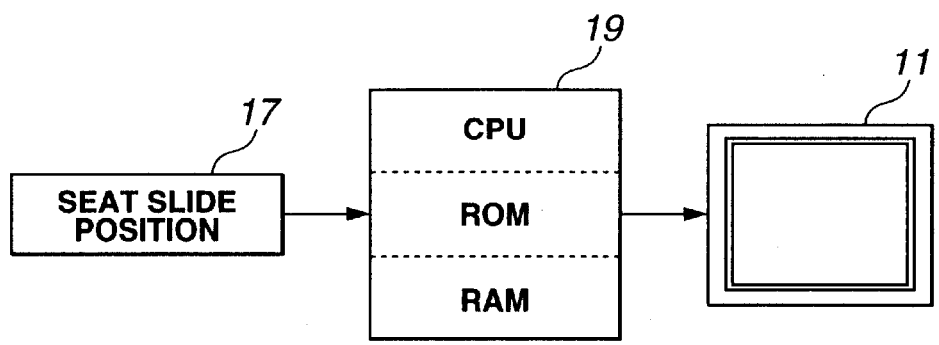
FIG. 1 is a block diagram showing a display apparatus according a first embodiment of the present invention.
Figure 2:
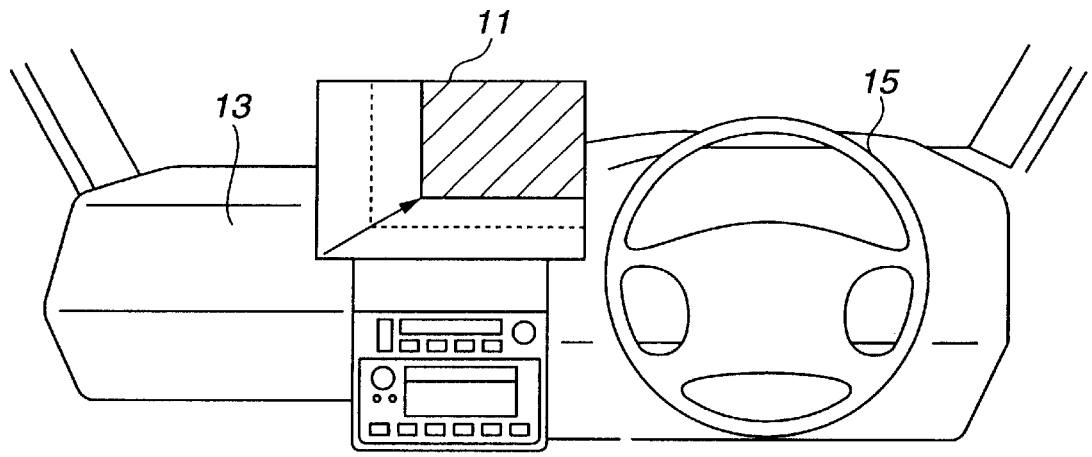
FIG. 2 is a front view of a display unit of the display apparatus of FIG. 1, disposed in a front central portion of a passenger compartment of a vehicle.

FIG. 1 shows an in-vehicle display apparatus or system according to a first embodiment of the present invention. FIG. 2 shows a vehicle including a display unit 11 disposed in front of a driver's seat on one side (left side in this example) of a steering wheel 15 (or on a front passenger's seat's side). Display unit 11 in this example is used as a display unit of a vehicle navigation system including a vehicle positioning section for sensing a current vehicle position with a GPS unit or a geomagnetic sensor (or magnetic compass), a map storage section for storing road map information, and a processor section for determining a route to a destination from the vehicle location by lookup from the stored road map information and indicating the route in a map of a surrounding area together with the current vehicle position. Moreover, display unit 11 may be used as a display for indicating operating conditions of an air conditioning system and other accessory systems. As shown in FIG. 2, display unit 11 is disposed in a center region of an instrument panel 13, laterally between a driver's seat (on the right side in this example) and a front passenger's seat (on the left side). That is, display unit 11 is located on an inboard side (left side) of steering wheel 15. Display unit 11 serves as means for presenting various visual information to a driver.

The in-car display apparatus of this example further includes a sensor section including an eye position sensor 17 for sensing a driver's eye position and a controller (or display controller) 19 including as a main component a microcomputer including CPU, ROM, RAM and other components. In this example, the eye position sensor is in the form of a seat slide position sensor 17. The CPU executes a control program stored in ROM by using the sensed position sensed by seat slide position sensor 17 and data stored in RAM, and controls the display unit 11 by sending a control signal.

Seat slide position sensor 17 is a position sensor arranged to sense a seat position of an adjustable driver's seat along a line parallel to a vehicle longitudinal direction. When the seat position is adjusted back and forth in the longitudinal direction, the driver's eye position moves back and forth in the vehicle longitudinal direction. Therefore, the display apparatus of this example can sense the driver's eye position by sensing the seat position of the driver's seat with seat slide position sensor 17. Seat slide position sensor 17 serves as means for sensing a condition, such as the driver's eye position, affecting the degree of annoyance of a display screen to a driver.

Figure 3A:
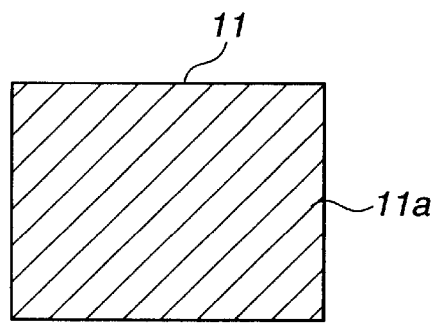
FIGS. 3A, 3B and 3C are views for illustrating the area and position of a picture display region on a screen of the display unit of FIG. 2, controlled by the display apparatus of FIG. 1.
Figure 3B:
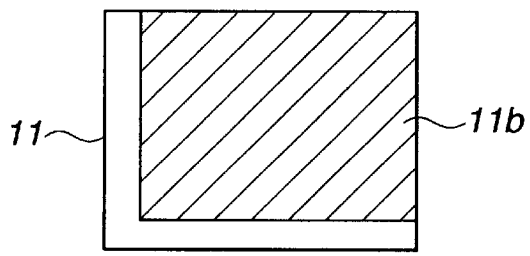
Figure 3C:
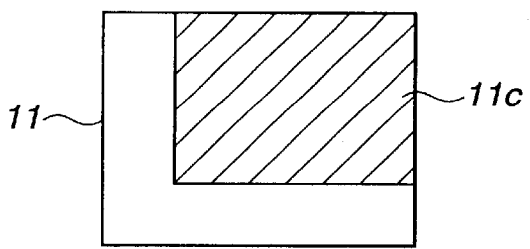

Controller 19 alters a picture display region on the screen of display unit 11 as shown in FIGS. 3A, 3B and 3C in accordance with the driver's eye position sensed by seat slide position sensor 17. The picture display region is a region in which various information in the form of text or graphics or in any other form is displayed. When the seat slide position is at a rear end position, the entire area of the screen is used as the display region, and the display region is maximum, as shown in FIG. 3A. Display unit 11 is operated in a full-screen mode. FIG. 3B shows the display region obtained when the seat slide position is about the middle between the rear end position and a front end position. FIG. 3C shows the display region obtained when the seat slide position is at the front end position. Thus, controller 19 reduces the size of the display region and shifts the position of the display region in a diagonal direction between an upward direction and a lateral direction toward the position of the driver's seat or toward the position of steering wheel 15 as the driver's eye position represented by the seat slide position moves forward toward the front of the vehicle. The display region is substantially rectangular, and bounded by upper and lower horizontal sides and left and right vertical sides. As the driver's eye position moves forward, this display apparatus shifts the lower horizontal side of the display region upward toward the upper horizontal side and simultaneously shifts the vertical left side (that is, the far side remoter from the position of the driver's seat or from the position of steering wheel 15) rightward toward the right vertical side (that is, the near side closer to the position of the driver's seat or the position of steering wheel 15) without shifting the upper horizontal side and the near (right) side of the display region.

Figure 4:
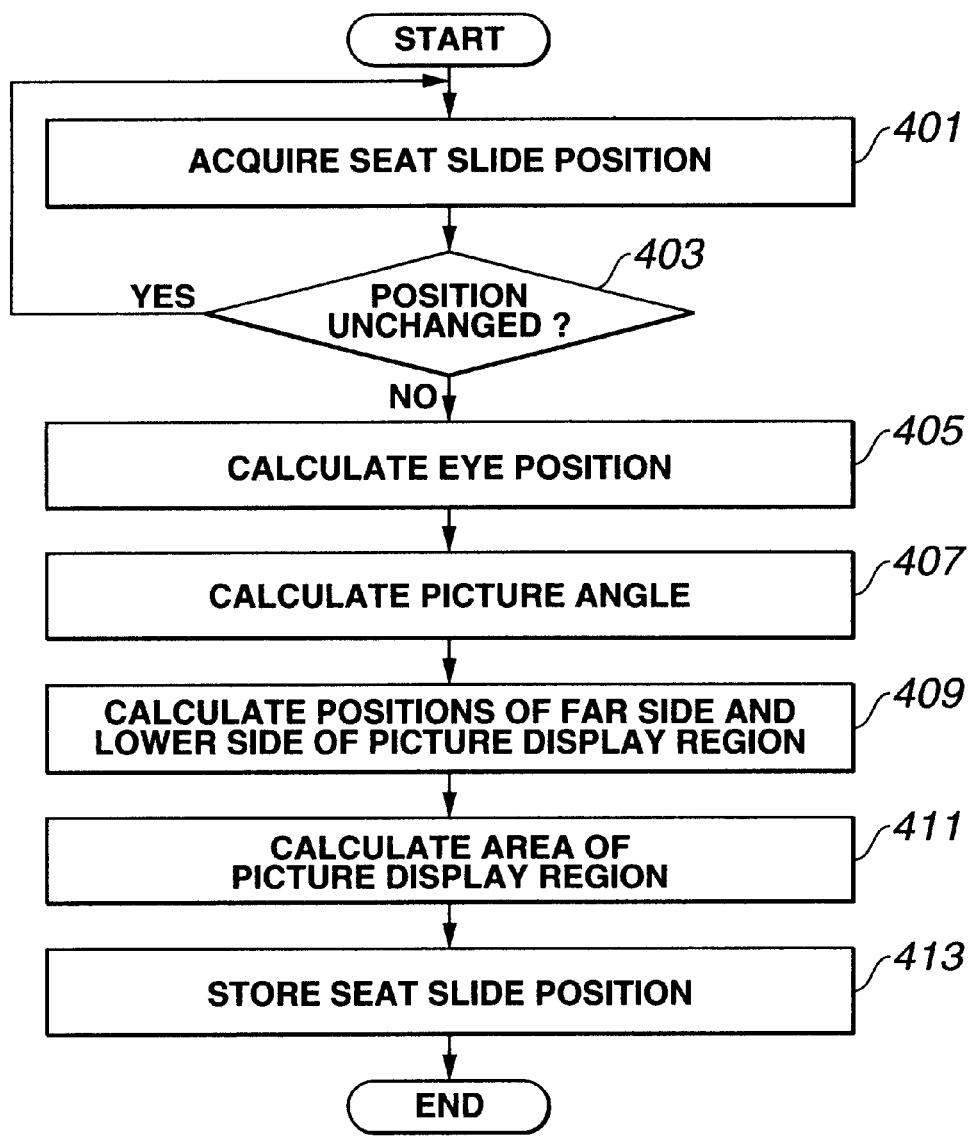
FIG. 4 is a flowchart showing a display control process performed by a display controller shown in FIG. 1.
Figure 5:
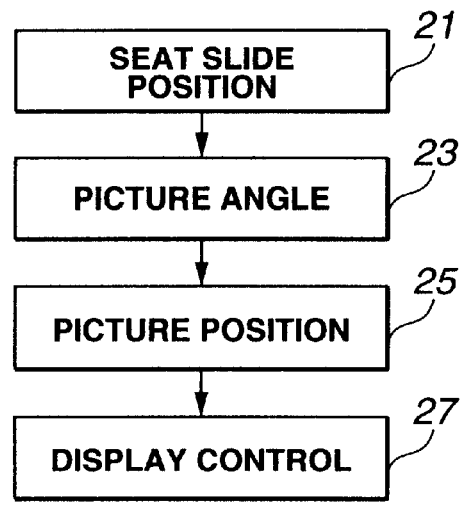
FIG. 5 is a block diagram showing functions of the display controller of FIG. 1.

The CPU of controller 19 performs control operations as shown in a flowchart of FIG. 4 and in a functional block diagram of FIG. 5. When the driver in the driver's seat adjusts the position of the seat in the front and rear direction, the seat slide position sensor 17 senses the newly adjusted position of the driver's seat, and the sensed seat slide position is stored in RAM (step 401).

Then, the current seat slide position thus obtained in this operating cycle is compared with a previous seat slide position obtained in a previous operating cycle, by a slide position judging section 21 (step 403). When the current seat slide position and the previous seat slide position are in agreement with each other, then controller 19 assumes that the driver's eye position remains unchanged, and holds the display region of display unit 11 unchanged. When the current seat slide position and the previous seat slide position are not in agreement, that is when the driver's eye position is changed, then CPU calculates the driver's eye position on the basis of relationships between the seat slide position and eye position as shown in FIGS. 6A and 6B (step 405).

Figure 6A:
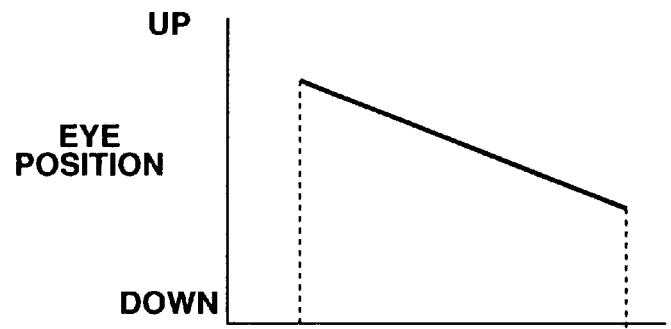
FIGS. 6A and 6B are diagrams showing relationships between an eye position and a driver's seat position, used in the control process of FIG. 4.
Figure 6B:
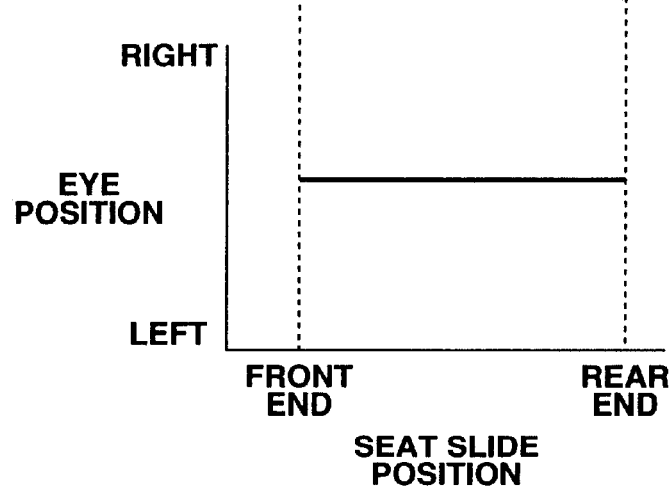

FIG. 6A shows a vertical eye position (height) in the vertical direction as viewed in a side elevation, and FIG. 6B shows a lateral eye position in the left and right (lateral) direction of the vehicle as viewed in a plan view. As shown in FIG. 6A, the eye position moves upward as the seat position moves forward toward the front of the vehicle. The relationships shown in FIGS. 6A and 6B are stored in ROM of controller 19.

Figure 7A:
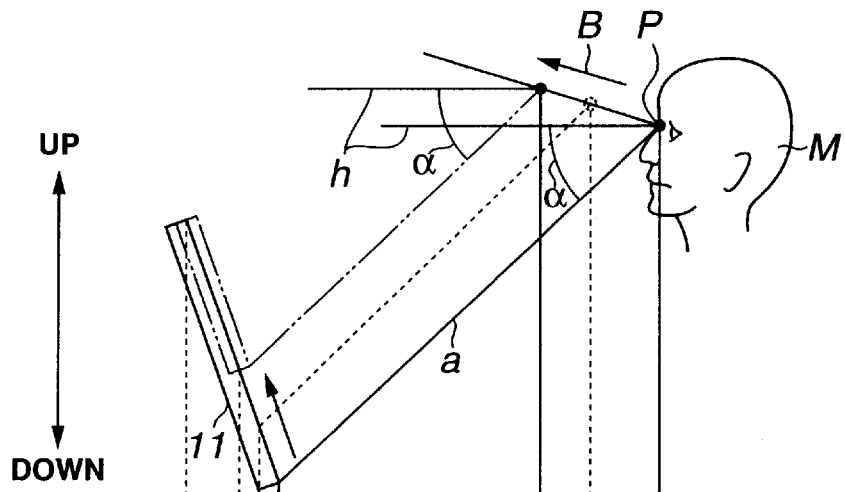
FIGS. 7A and 7B are side elevation and plan view illustrating a downward angle $\alpha$ and a sideward angle $\beta$, used in the control process of FIG. 4.
Figure 7B:
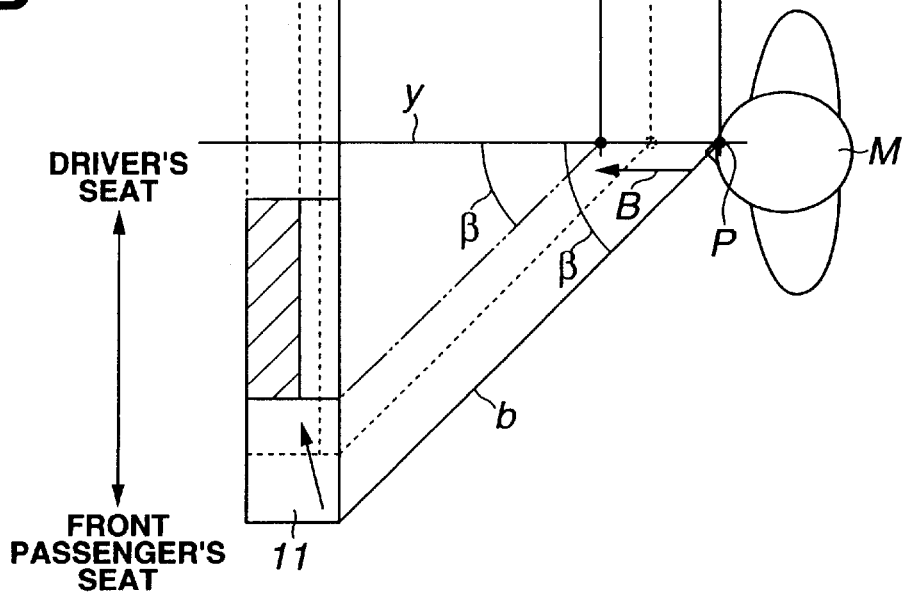

A driver's picture angle (viewing angle) with respect to display unit 11 defined by a downward angle (depression angle) α and a sideward angle β as shown in FIGS. 7A and 7B is calculated by a picture angle calculating section 23 (step 407) by using a coordinate location (coordinates) of the eye position calculated at step 405, and a coordinate location (coordinates) of a lower left (far side) corner of the rectangular display region. ROM stores the coordinate location of the lower left corner at which the lower side and the far side on the front passenger's seat's side meet. In FIGS. 7A and 7B, M denotes the head of the driver seated in the driver's seat.

As shown in the side elevation of FIG. 7A, the downward (viewing) angle α is an angle formed between a straight line "a" connecting the eye position P and the lower side of the rectangular display region and a horizontal line "h" extending in the longitudinal direction of the vehicle. As shown in the plan view of FIG. 7B, the sideward (viewing) angle β is an angle formed between a straight line "b" connecting the eye position p and the far side (left side) of the rectangular display region and a straight line "y" extending in the longitudinal direction of the vehicle.

In this example, the picture angle (at least one of the downward angle α and the sideward angle β) is held constantly at a desired angle stored in ROM, irrespectively of movement of the eye position P in a direction shown by an arrow B in FIGS. 7A and 7B. By comparing the calculated picture angle with the desired angle stored in ROM, a picture position calculating section 25 calculates the position of at least one of the far (left) side and the lower side of the display region on the display screen so as to control the picture angle at the desired angle (step 409). The display apparatus of this example holds the downward viewing angle α and the sideward viewing angle β invariably at predetermined respective adequate angles by shifting the lower side and the far side of the rectangular display region.

Figure 8:
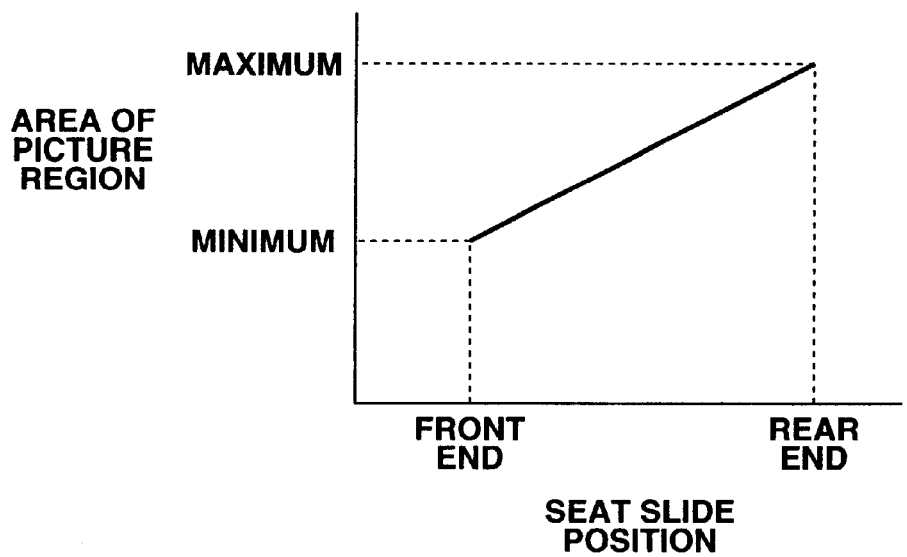
FIG. 8 is a graph showing a relationship between the size of the display region and the driver's seat position, used in the control process of FIG. 4.

The positions of the far side and lower side of the picture display region are determined, by using, as a starting original point, the upper near side corner of the screen on the driver's seat's side, from the desired area of the picture display region, stored in ROM, so as to hold the downward angle α and sideward angle β at respective desired angles. As shown in FIG. 8, the desired area of the picture display region is decreased as the seat slide position moves forward. In this example, the controller alters the display region on the screen so as to hold the driver's downward viewing angle α to the lower side of the display region substantially constant at an angle of 20° and to hold the driver's sideward viewing angle β to the far side of the display region substantially constant at an angle of 30°.

Then, a display control section 27 alters the display region in display unit 11 to achieve the thus-determined desired area of the display region (step 411). Therefore, as the seat slide position (representing the driver's eye position) is moved from the rear end position to the front end position, the picture display region shown by hatching is reduced in size gradually from a maximum full-screen size 11a through a medium size 11b to a smaller size 11c as shown in FIGS. 3A, 3B and 3C, and simultaneously shifted upwardly and laterally toward the driver's seat's side. Finally, the seat slide position obtained at step 401 in the current operating cycle is stored as update in RAM (step 413).

When the distance from a driver to the display screen is decreased by adjustment of the driver's seat by a driver of relatively small stature, for example, the display apparatus according to this embodiment reduces the size of the display region and shifts the position of the display region upward and laterally toward the position of the driver's seat, so that the driver can drive the vehicle without being bothered by the display, and perceive information securely in the display region of adequate size and position to the driver. In some cases, moreover, the adjustment of the size and position of the display region eliminates the problem of obstruction caused by steering wheel 15.

In the illustrated example, the seat slide position sensor is used as eye position sensor. Alternatively, the eye position sensor may be arranged to sense the set position of an inside rear view mirror or a door mirror, or may be arranged to sense the eye position directly by image processing operation. Display unit 11 may be a head-up display projecting image onto the windshield of the vehicle.

Figure 9:
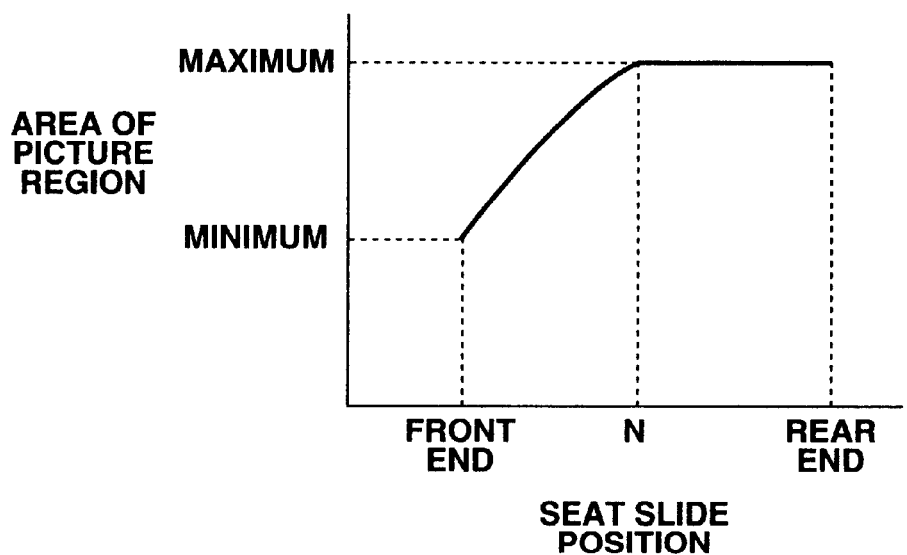
FIG. 9 is a graph showing a relationship between the size of the display region and the driver's seat position, used in a second embodiment of the present invention.

FIG. 9 show a relationship between the seat slid position and the area of the display region, employed in an in-car display apparatus according to a second embodiment of the present invention. In the second embodiment, the picture angle defined by the downward angle α and the sideward angle β shown in FIGS. 7A and 7B is not held constant over the entire extent from the front end position to the rear end position in the operation of step 409 of FIG. 4. In the example of FIG. 9, the area of the display region is set constantly equal to the maximum full-screen size, and the entire effective area of the screen is used as the display region when the seat slide position is at or in the rear of a predetermined intermediate position N which, in this example, located at the middle between the front and rear end positions. In the front range between the front end position and the intermediate position N, the display region is reduced in size gradually as in the first embodiment as the seat slide position moves forward toward the front end position.

In this example, therefore, the driver's picture angle with respect to the display region is maximum at the intermediate position N, and this maximum angle is set as a threshold value. When the picture angle is greater than the thus-determined threshold value, that is when the seat slide position is moved forward beyond the intermediate position N, this apparatus judges that the picture angle (or the viewing angle) is too large for the driver, and hence reduces the size of the display region so as to hold the picture angle constant at the level determined by the threshold.

By adjusting the size and position of the display region in this way, the display apparatus according to this embodiment can provide visual representation not troublesome especially for a smaller driver preferring a forward seat position, and provide visual representation easy to perceive with the maximum picture frame especially to a greater driver preferring a seat position at or in the rear of the middle position N.

In the example of FIG. 9, the area of the picture display region is varied from the maximum to the minimum only in the range between the front end position and the middle position N whereas the range in the example of FIG. 8 extends between the front end position and the rear end position. Therefore, in the example of FIG. 9, the area of the display region is reduced along a curved line to vary the area gradually without causing unnatural feel to the driver.

Figure 10:
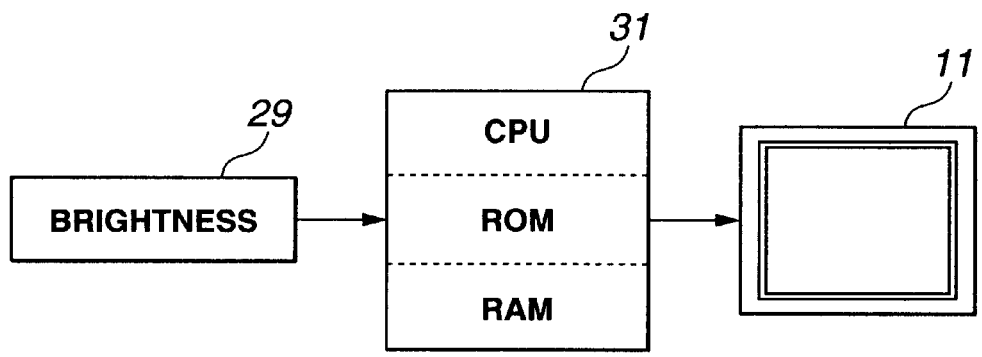
FIG. 10 is a block diagram showing a display apparatus according to a third embodiment of the present invention.

FIG. 10 shows an in-car display apparatus according a third embodiment of the present invention. Instead of the seat slide position sensor 17 of FIG. 1, there is provided a brightness sensor 29 for sensing the brightness of the outside of the vehicle. In accordance with the outside brightness sensed by the brightness sensor 29, a controller 31 composed of at least CPU, ROM and RAM controls the picture display region on a screen of a display unit 11. In this example, the brightness sensor is an illuminance sensor (or meter) mounted on the vehicle at an outside position outside the vehicle.

Figure 11:
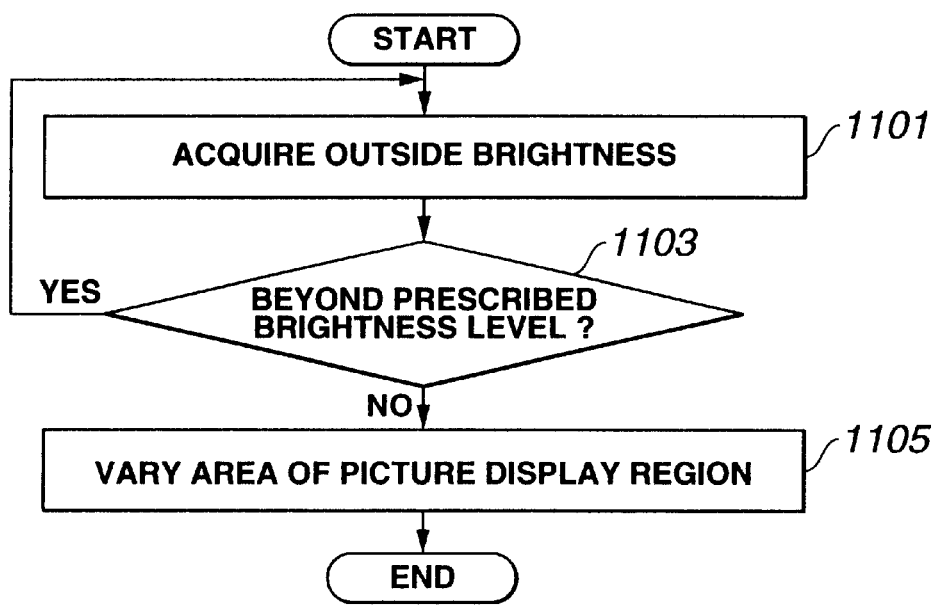
FIG. 11 is a flowchart showing a display control procedure performed by a display controller of the display apparatus of FIG. 10.
Figure 12:
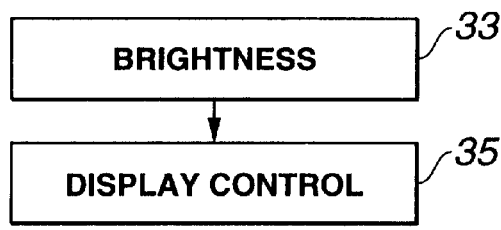
FIG. 12 is a block diagram showing functions of the display controller of FIG. 10.

The CPU of controller 31 performs control operations as shown in a flowchart of FIG. 11 and in a functional block diagram of FIG. 12. First, brightness sensor 29 senses the outside brightness, and the sensed brightness is stored in RAM (step 1101).

Figure 13A:
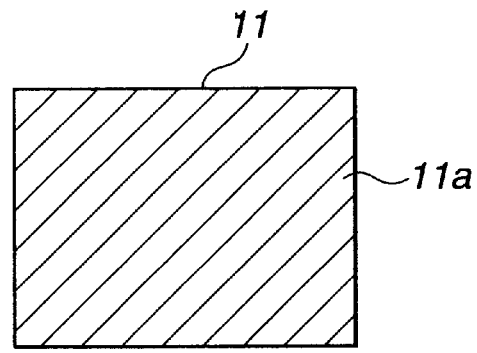
FIGS. 13A and 13B are views showing a display region controlled by the display controller of FIG. 10.

Then, the sensed brightness is compared with a prescribed brightness level stored in ROM, by a brightness judging section 21 (step 1103) to determine whether the sensed brightness is higher (or brighter) than the prescribed level. When the sensed outside brightness is higher than the prescribed level, then controller 32 holds the display region unchanged at a maximum size 11a as shown in FIG. 13A. When the sensed outside brightness is lower than the prescribed level, then a display control section 35 reduces the display region to a smaller size 11b as shown in FIG. 13B, stored in ROM (step 1105).

Figure 13B:
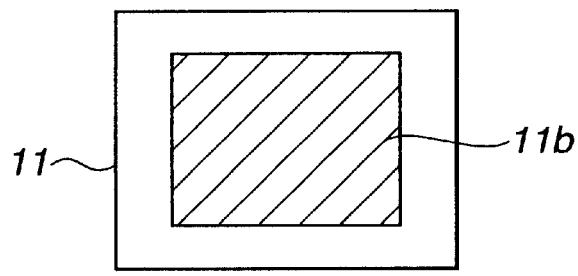

When the outside is darker than the prescribed level, then controller 31 reduces the size of the display region on the screen of display unit 11 so that the driver is relieved from trouble due to the brightness of display unit In the example shown in FIGS. 13A and 13B, the display region is alternated in a manner of two-step control system, between the larger (maximum) size 11a and the reduced size 11b, and the position of the display region is held constantly at the center of the screen. However, it is optional to vary the area of the display region gradually in dependence on the outside brightness, and/or to shift the position of the display region upwardly and laterally toward the position of steering wheel 15 as in the first embodiment.

Instead of the illuminance sensor, it is optional to employ a switch position sensor for sensing an on/off state of a switch for headlamp of the vehicle. When the headlamp is turned on, controller 31 judges that it gets dark outside, and reduces the size of the display region.

Figure 14:
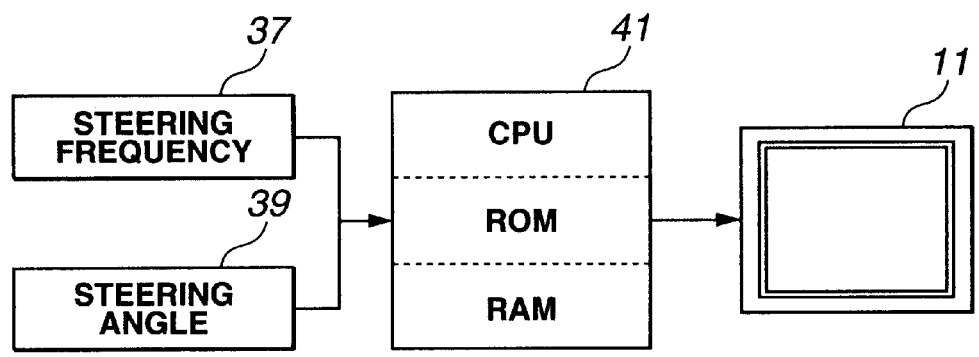
FIG. 14 is a block diagram showing a display apparatus according to a fourth embodiment of the present invention.

FIG. 14 shows an in-car display apparatus according to a fourth embodiment of the present invention. An input section or sensor section of this apparatus includes a steering frequency sensor 37 for sensing a frequency at which steering wheel 15 is operated, and a steering angle sensor 39 for sensing a steering angle of the vehicle. A controller 41 composed of at least CPU, ROM and RAM receives signals from steering frequency sensor 37 and steering angle sensor 39, and controls the display region on a screen of a display unit 11 in accordance with the input information from sensors 37 and 39.

Steering frequency sensor 37 in this example is a sensor capable of sensing a steering operation turning the steering wheel beyond a predetermined angle in a leftward or rightward steering direction. Steering angle sensor 39 of this example is a steering wheel angle sensor for sensing a steering wheel angle of steering wheel 15.

Figure 15:
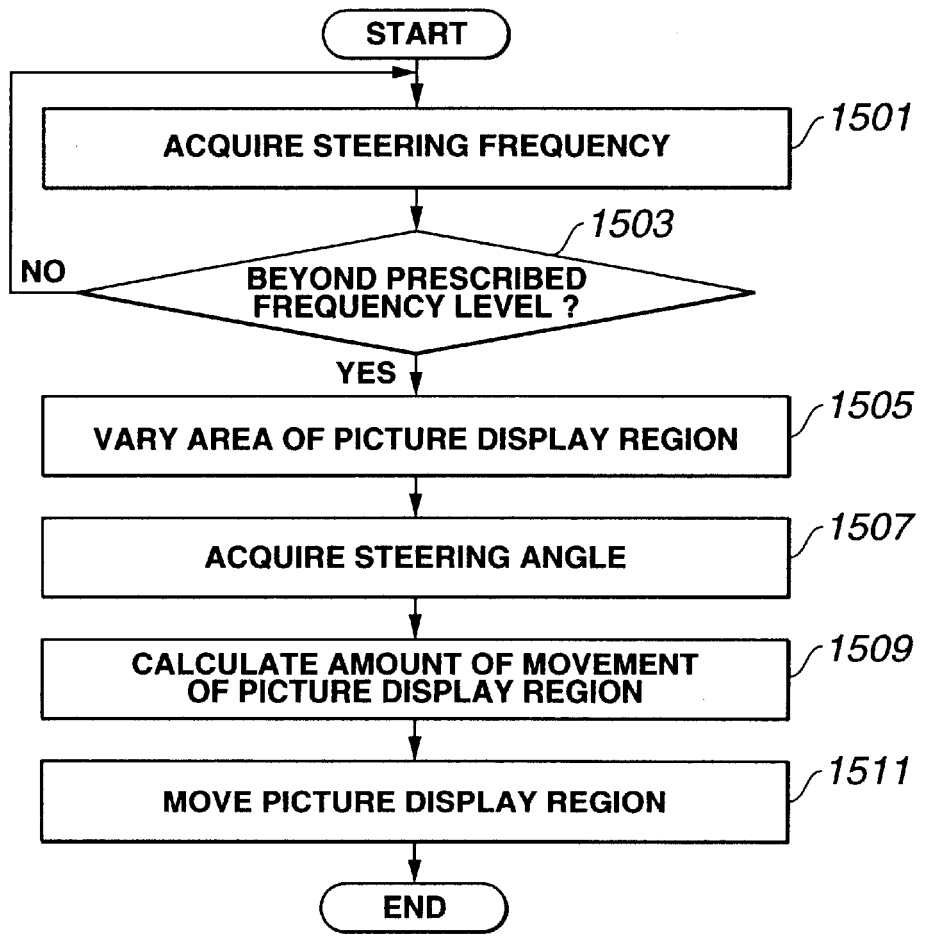
FIG. 15 is a flowchart showing a display control procedure performed by a display controller of the display apparatus of FIG. 14.
Figure 16:
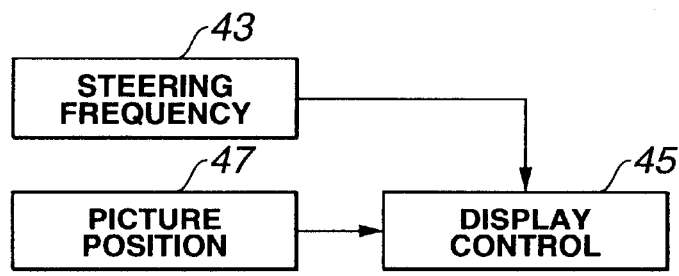
FIG. 16 is a block diagram showing functions of the display controller of FIG. 14.

The CPU of controller 41 performs control operations as shown in a flowchart of FIG. 15 and in a functional block diagram of FIG. 16. First, the steering frequency sensed by steering frequency sensor 37 is taken in and stored in RAM (step 1501). Then, a steering frequency judging section 43 checks whether the sensed steering frequency is higher than a predetermined frequency level by checking whether the number of driver's steering operations beyond the predetermined steering amount within a predetermined time is greater than a predetermined number (step 1503).

Figure 17A:
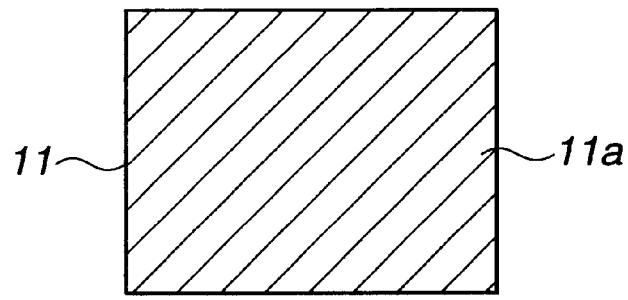
FIGS. 17A, 17B and 17C are views showing a display region controlled by the display controller of FIG. 14.
Figure 17B:
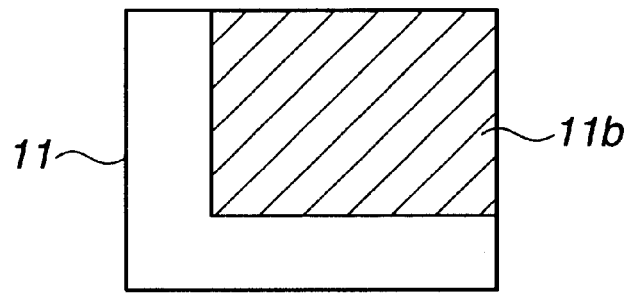

When the sensed steering frequency is lower than the predetermined level stored in ROM, then controller 41 holds the display region at the maximum full-screen size 11a as shown in FIG. 17A. When the steering frequency is higher than the predetermined level, a display control section 45 of controller 41 reduces the area of the display region to a reduced size 11b as shown in FIG. 17B stored in ROM (step 1505). In the example of FIG. 17B, the reduced display region is shifted upward and laterally toward the position of steering wheel 15. However, it is optional to hold the reduced display region at the center of the screen as shown in FIG. 13B.

Figure 17C:
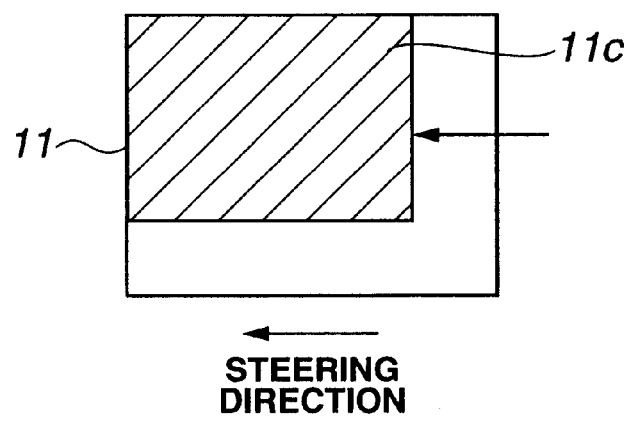

Furthermore, the steering angle sensed by steering angle sensor 39 is taken in and stored in RAM (step 1507). When the steering direction determined from the output signal of steering angle sensor 39 is toward the front passenger's seat's side (that is, the leftward steering direction in the example shown in FIG. 2), then controller 41 calculates an amount of movement of the display region toward the front passenger's seat's side in accordance with the steering angle with a picture position calculating section 47 (step 1509). A display control section 45 shifts the reduced display region by the calculated amount of movement, toward the front passenger's seat's side in the steering direction to the position of a region 11c shown in FIG. 17C (step 1511).

When the vehicle is running along a straight road and hence the steering frequency is low, the entirety of the screen is used as the display region. In the case of operation along a mountain road, the steering frequency tends to become higher, and the display apparatus reduces the size of the display region to protect the driver from being distracted by the display. Moreover, the display apparatus of this embodiment provides visual representation at an adequate position adapted to a driver's steering operation so as to follow movement of the driver's line of sight.

This application is based on a prior Japanese Patent Application No. 2000-367237. The entire contents of this Japanese Patent Application No. 2000-367237 with a filing date of Dec. 1, 2000 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A display apparatus for a vehicle, comprising:
   a display unit comprising a screen presenting information to a driver, the display unit being disposed in a front central region of a passenger compartment;
   a sensor section comprising an eye position sensor to sense an eye position of the driver; and
   a controller to reduce a size of a display region on the screen of the display unit and to shift a position of the display region in the screen upwardly toward a driver's seat's side as the eye position moves forward.

2. The display apparatus as claimed in claim 1, wherein the display unit is located in front of a driver's seat on a first lateral side toward a position of a front passenger's seat, and the controller shifts the position of the display region upwardly toward a second lateral side opposite to the first lateral side as the eye position is shifted forwardly and upwardly.

3. The display apparatus as claimed in claim 1, wherein the controller alters the display region on the screen so as to hold a driver's viewing angle relative to the display region invariably at a predetermined constant angle.

4. The display apparatus as claimed in claim 1, wherein the controller alters the display region on the screen so as to hold a driver's viewing angle relative to the display region invariably at a constant angle when the driver's viewing angle is greater than a predetermined threshold value.

5. The display apparatus as claimed in claim 1, wherein the controller holds the display region at a maximum size to use the entirety of the screen as the display region when the eye position is located on a rear side of a predetermined position.

6. The display apparatus as claimed in claim 1, wherein the eye position sensor comprises a seat position sensor to sense a position of an adjustable driver's seat in a longitudinal direction of the vehicle.

7. The display apparatus as claimed in claim 1, wherein the display unit is located on an inboard side of a steering wheel of the vehicle; the screen is substantially rectangular and bounded by upper and lower sides, a far side remoter from the steering wheel and a near side closer to the steering wheel; the display region is a rectangular frame bounded by upper and lower sides, a far side remoter from the steering wheel and a near side closer to the steering wheel; and the controller shifts the lower side of the display region upward toward the upper side of the screen and the far side of the display region laterally toward the near side of the screen as the eye position is shifted forward.

8. The display apparatus as claimed in claim 7, wherein the controller holds a driver's downward viewing angle to the lower side of the display region substantially constant at a predetermined angle by shifting the lower side of the display region in accordance with the eye position, and holds a driver's sideward viewing angle to the far side of the display region substantially constant at a predetermined angle by shifting the far side of the display region in accordance with the eye position, the downward viewing angle being an angular distance in a vertical plane between a horizontal line and a straight line connecting the eye position and the lower side of the display region, and the sideward viewing angle being an angular distance in a horizontal plane between a straight line parallel to a longitudinal direction of the vehicle and a straight line connecting the eye position and the far side of the display region.

9. The display apparatus as claimed in claim 1, wherein the sensor section further comprises an outside brightness sensor to sense a darkness outside the vehicle; and the controller is configured to reduce the size of the display region in the screen of the display unit in accordance with the darkness sensed by the outside brightness sensor.

10. The display apparatus as claimed in claim 1, wherein the sensor section further comprises a steering frequency sensor to sense a driver's steering frequency; and the controller is configured to reduce the size of the display region in the screen of the display unit when the steering frequency increases.

11. The display apparatus as claimed in claim 10, wherein the sensor section further comprises a steering direction sensor to sense a steering direction of a driver's steering operation; and the controller shifts the display region in the steering direction.

12. The display apparatus as claimed in claim 10, wherein the sensor section further comprises an outside brightness sensor to sense a darkness outside the vehicle; and the controller is configured to reduce the size of the display region in the screen of the display unit in accordance with the darkness sensed by the outside brightness sensor.

13. A display apparatus for a vehicle, comprising:
- a display unit comprising a screen presenting information to a driver of a vehicle, the display unit being located in a front region of a passenger compartment of the vehicle;
- an outside brightness sensor to sense a brightness outside the vehicle; and
- a controller to vary a size of a display region in the screen of the display unit in accordance with the brightness sensed by the outside brightness sensor.

14. The display apparatus as claimed in claim 13, wherein the controller reduces the size of the display region when the brightness outside decreases.

15. The display apparatus as claimed in claim 13, wherein the outside brightness sensor is an illuminance sensor.

16. A display apparatus comprising:
- a display unit comprising a screen presenting information to a driver of a vehicle, the display unit being disposed in a front region of a passenger compartment of the vehicle;
- a sensor section comprising a steering frequency sensor to sense a driver's steering frequency; and
- a controller to reduce a size of a display region on the screen of the display unit when the steering frequency increases.

17. The display apparatus as claimed in claim 16, wherein the sensor section further comprises a steering angle sensor to sense a steering direction of a driver's steering operation, and the controller shifts the display region when reduced in size, in the steering direction within the screen.

18. A display apparatus for a vehicle, comprising:
- means for presenting visual representation in a display region on a screen located in a front region of a passenger compartment of the vehicle;
- means for sensing an eye position of a driver relative to the screen; and
- means for altering the size of the display region on the screen in accordance with the eye position of the driver.

19. A display control process for a vehicle, comprising:
- sensing an eye position of a driver relative to a screen of a display unit in a passenger compartment of the vehicle; and
- increasing the size of a display region within the screen when the eye position is shifted rearward away from the screen.

* * * * *